United States Patent
Berndtsson et al.

(10) Patent No.: US 10,657,500 B2
(45) Date of Patent: May 19, 2020

(54) METHOD AND COMMUNICATION NODE FOR FACILITATING PARTICIPATION IN TELEMEETINGS

(71) Applicant: TELEFONAKTIEBOLAGET LM ERICSSON (PUBL), Stockholm (SE)

(72) Inventors: Gunilla Berndtsson, Nacka (SE); Morgan Lindqvist, Sundbyberg (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 869 days.

(21) Appl. No.: 15/105,326

(22) PCT Filed: Dec. 19, 2013

(86) PCT No.: PCT/EP2013/077402
§ 371 (c)(1),
(2) Date: Jun. 16, 2016

(87) PCT Pub. No.: WO2015/090412
PCT Pub. Date: Jun. 25, 2015

(65) Prior Publication Data
US 2016/0314438 A1   Oct. 27, 2016

(51) Int. Cl.
*G06Q 10/00* (2012.01)
*G06Q 10/10* (2012.01)
(Continued)

(52) U.S. Cl.
CPC ......... *G06Q 10/1095* (2013.01); *H04L 51/08* (2013.01); *H04L 65/1069* (2013.01)

(58) Field of Classification Search
None
See application file for complete search history.

(56) References Cited

U.S. PATENT DOCUMENTS 8,019,069 B1   9/2011   Cyriac et al.
8,417,551 B2 *  4/2013   Collet .............. G06Q 10/06311
                                                    705/7.13
(Continued)

FOREIGN PATENT DOCUMENTS

EP   2317692 A2   5/2011

OTHER PUBLICATIONS

International Search Report dated Aug. 8, 2014, in International Application No. PCT/EP2013/077402, 5 pages.

*Primary Examiner* — Gurkanwaljit Singh
(74) *Attorney, Agent, or Firm* — Patent Portfolio Builders, PLLC

(57) ABSTRACT

A method performed by a communication node in a communication network operative for facilitating participation in telemeetings comprises receiving, from an organizer communication device, a message for invitation to a telemeeting comprising a meeting agenda with a number of agenda items and a time schedule for each of the number of agenda items, and making the meeting agenda available on the communication network for a number of candidate participant communication devices. The method further comprises receiving a message from a first of the candidate participant communication devices comprising information of a selection of individual agenda items out of the number of agenda items, and, during the telemeeting, receiving a message comprising information from the organizer communication device about the number of agenda items that are currently treated.

14 Claims, 7 Drawing Sheets

(51) Int. Cl.
*H04L 12/58* (2006.01)
*H04L 29/06* (2006.01)

(56) References Cited

U.S. PATENT DOCUMENTS

| | | | |
|---|---|---|---|
| 8,483,375 B2 | 7/2013 | Dhara et al. | |
| 8,484,061 B2 * | 7/2013 | Collet | G06Q 10/06311 |
| | | | 705/7.13 |
| 8,600,794 B2 * | 12/2013 | Blair | G06Q 10/1095 |
| | | | 705/7.18 |
| 9,870,554 B1 * | 1/2018 | Leung | G06F 16/24575 |
| 2005/0050061 A1 | 3/2005 | Karstens | |
| 2005/0177614 A1 * | 8/2005 | Bourne | H04L 51/32 |
| | | | 709/200 |
| 2006/0224430 A1 * | 10/2006 | Butt | G06Q 10/063116 |
| | | | 705/7.16 |
| 2007/0005406 A1 * | 1/2007 | Assadian | G06Q 10/109 |
| | | | 705/7.18 |
| 2009/0083378 A1 * | 3/2009 | Lingafelt | G06F 15/16 |
| | | | 709/204 |
| 2009/0225971 A1 | 9/2009 | Miller et al. | |
| 2009/0307044 A1 * | 12/2009 | Chakra | G06Q 10/109 |
| | | | 705/7.18 |
| 2010/0088144 A1 * | 4/2010 | Collet | G06Q 10/06311 |
| | | | 705/7.13 |
| 2010/0205541 A1 * | 8/2010 | Rapaport | G06Q 10/10 |
| | | | 715/753 |
| 2010/0318399 A1 * | 12/2010 | Li | G06Q 10/109 |
| | | | 705/7.18 |
| 2011/0038472 A1 | 2/2011 | Gartner et al. | |
| 2011/0149809 A1 * | 6/2011 | Narayanaswamy | H04L 12/1818 |
| | | | 370/260 |
| 2011/0271332 A1 * | 11/2011 | Jones | H04L 9/3247 |
| | | | 726/7 |
| 2012/0191500 A1 * | 7/2012 | Byrnes | G06Q 10/1095 |
| | | | 705/7.19 |
| 2012/0290950 A1 * | 11/2012 | Rapaport | H04L 51/32 |
| | | | 715/753 |
| 2013/0091067 A1 * | 4/2013 | Barton | G06Q 10/00 |
| | | | 705/319 |
| 2014/0129576 A1 * | 5/2014 | Bank | G06Q 10/109 |
| | | | 707/758 |
| 2015/0248651 A1 * | 9/2015 | Akutagawa | G06Q 10/1095 |
| | | | 705/7.19 |

* cited by examiner

METHOD AND COMMUNICATION NODE FOR FACILITATING PARTICIPATION IN TELEMEETINGS

CROSS REFERENCE TO RELATED APPLICATION(S)

This application is a 35 U.S.C. § 371 National Phase Entry Application from PCT/EP2013/077402, filed Dec. 19, 2013, designating the United States, the disclosure of which is incorporated herein in its entirety by reference.

TECHNICAL FIELD

The present disclosure relates generally to a communication node and a method performed by a communication node in a communication network for facilitating participation in telemeetings.

BACKGROUND

In society of today and especially in enterprises of today there is a high number of meetings and conferences. At the same time, people that need to meet are often situated at places that are distant from each other. To be able to meet at a conference without having to travel large distances, the teleconference service was invented. The teleconference service provides a communication connection between all participants of the service, mostly a voice connection but more and more also a video connection, sometimes called a videoconference. There may also be mixed conferences comprising both video connections and sole voice connections, a common name for all types of teleconferences are telemeetings.

In many telemeetings there is a plurality of agenda items that are to be discussed. A participant in a telemeeting might only be interested in participating in a limited number of the plurality of agenda items, not in participating in the whole meeting. A participant that is in interested in a specific agenda item often joins a whole meeting and thereby may waste working time. Also, if she tries to work in parallel she can miss the agenda item she is interested in. For this reason there is today a service that makes it possible for a participant to join and leave a telemeeting at any time, for example joining the telemeeting at the time set in an agenda meeting schedule for the particular agenda item. U.S. Pat. No. 8,483,375 describes a service that makes it possible for a participant to automatically join a telemeeting at a scheduled meeting time.

However, even if there is a meeting schedule with specific times for the individual agenda items, the time it takes to treat each agenda item often differs from the scheduled time slot. Consequently, when joining the conference at the scheduled time, there is a risk to join the meeting far too early or too late, thereby wasting working time or missing out on the agenda item of interest or at least part of the agenda item of interest. Also, by joining conferences in the middle of an agenda item, there is a risk to disturb the meeting.

Consequently, there is a need to be able to automatically invite people to a telemeeting at a time point which is approximately when an agenda item actually starts to be discussed in the meeting.

SUMMARY

It is an object of the invention to address at least some of the problems and issues outlined above. It is another object to facilitate automatic connection to an ongoing telemeeting at a relevant time point for a meeting participant. It is possible to achieve these objects and others by using a method and an apparatus as defined in the attached independent claims.

According to an aspect, a method is provided performed by a communication node in a communication network operative for facilitating participation in telemeetings. The method comprises receiving, from an organizer communication device, a message for invitation to a telemeeting comprising a meeting agenda with a number of agenda items and a time schedule for each of the number of agenda items and making the meeting agenda available on the communication network for a number of candidate participant communication devices. The method further comprises receiving a message from a first of the candidate participant communication devices comprising information of a selection of individual agenda items out of the number of agenda items, and, during the telemeeting, receiving a message comprising information from the organizer communication device which of the number of agenda items that is currently treated. The method further comprises determining, based on the messages received from the first candidate participant communication device and the organizer communication device, whether there is a match between the selected individual agenda items and the item currently treated, and, when there is a match, triggering setup of a connection to the telemeeting for the first candidate participant communication device.

According to another aspect, a communication node is provided operative in a communication network for facilitating participation in telemeetings, the communication node comprising a processor and a memory. Said memory contains instructions executable by said processor. Said communication node is operative for receiving a message for invitation to a telemeeting comprising a meeting agenda with a number of agenda items and a time schedule for each of the number of agenda items from an organizer communication device, and making the meeting agenda available on the communication network for a number of candidate participant communication devices. Said communication node is further operative for receiving a message from a first of the candidate participant communication devices comprising information of a selection of individual agenda items out of the number of agenda items, and, during the telemeeting, receiving a message comprising information from the organizer communication device about which of the number of agenda items that is currently treated. Said communication node is further operative for determining, based on the messages received from the first candidate participant communication device and the organizer communication device, whether there is a match between the selected individual agenda items and the item currently treated, and, when there is a match, triggering setup of a connection to the telemeeting for the first candidate participant communication device.

According to other aspects, computer programs and computer program products are also provided, the details of which will be described in the claims and the detailed description.

The above method and communication node may be configured and implemented according to different optional embodiments. Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to facilitate participation in telemeetings. This is achieved by a communication node arranged to handle the telemeeting. The communication node is arranged to distribute a meeting agenda received for example from an organizing communication device belonging to an organizer of the meeting to candidate participating communication devices belonging to participants that are candidates to participate in the meeting. Then the communication node is arranged to receive information from the candidate participant devices about which agenda items the participants would like to participate in. Based on this information, and on information received from the organizing device on which agenda item that is currently presented, or about to be presented, the communication node determines which of the candidate participating devices that are to be invited. The communication node then automatically triggers setup to the telemeeting for the devices to be invited, the devices that are not already in the meeting. Thanks to such a solution it is possible for a participant of a telemeeting to be automatically invited to the agenda items she is interested in at the time point when the actual agenda item is to take place, irrespective of any shift in time in relation to the time schedule. Thereby, valuable working time is saved compared to if the participant had to sit the whole meeting or had to follow the meeting from the time the agenda item was to take place according to the original time schedule even though it in reality was a time shift in relation to the agenda time schedule.

Figure 1:
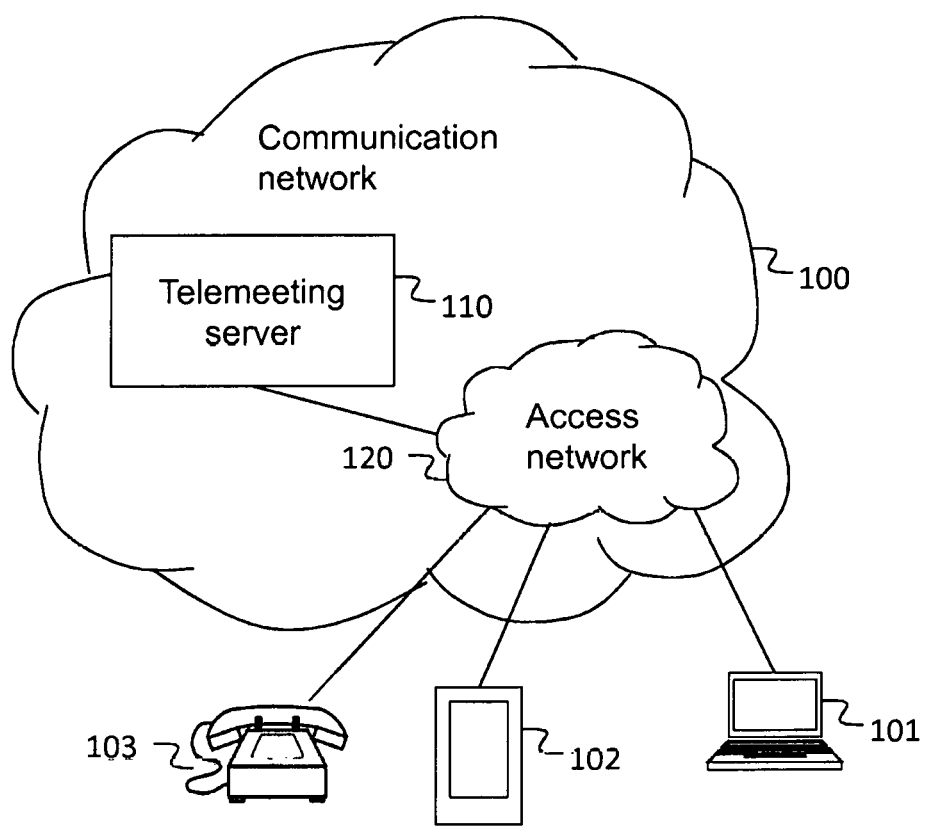
FIG. 1 is a schematic block diagram illustrating a communication system in which the present invention may be used.

FIG. 1 shows a communication network 100 providing a telemeeting service to communication devices 101, 102, 103. The communication devices may be any kind of device that has a possibility to communicate, such as a computer 101, e.g. laptop, a mobile terminal 102, i.e. a mobile phone, and a plain old telephone service terminal, POTS terminal 103 and videoconference equipment including a large screen. The communication network comprises a telemeeting server 110, and an access network 120 for providing access to the communication network for the communication devices 101, 102, 103.

Figure 2:
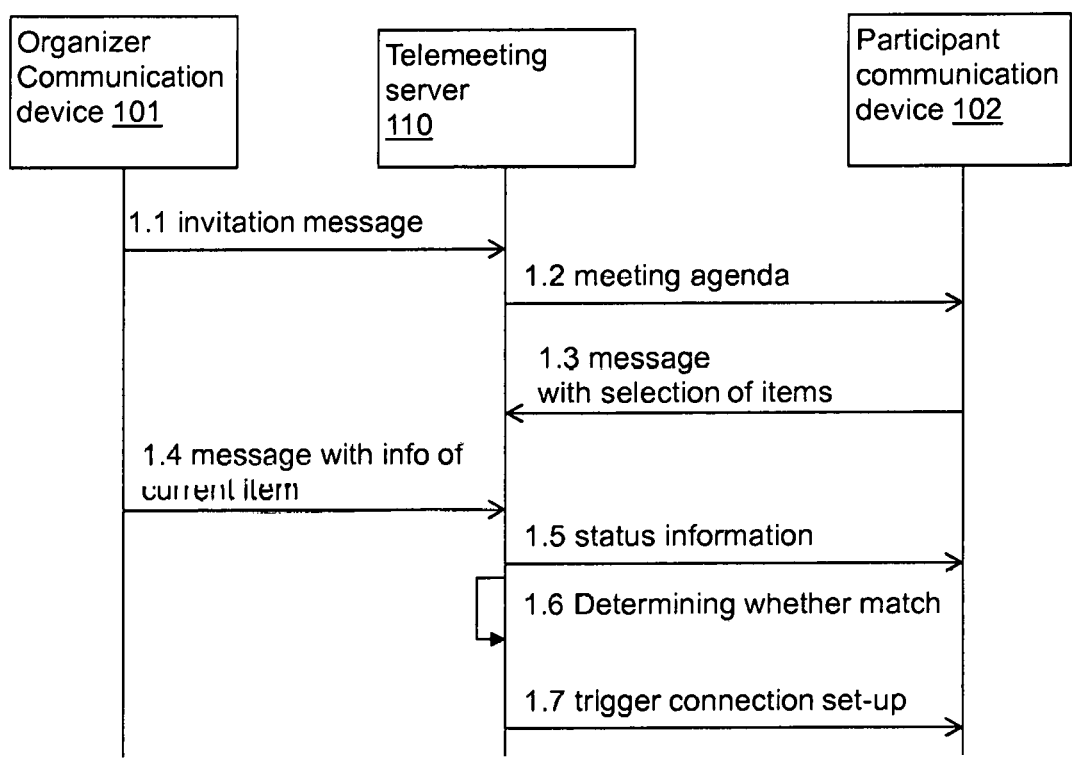
FIG. 2 is a signaling scheme according to a possible embodiment.

FIG. 2 shows a signaling diagram according to an embodiment describing possible signals sent in a communication network such as the communication network shown in FIG. 1. An invitation message is sent from an organizer communication device 101 to the telemeeting server 110, the invitation message comprising an invitation to a meeting including a meeting agenda with agenda items and a time schedule for individual of the agenda items. The telemeeting server 110 receives the invitation message and publishes 1.2 the meeting agenda e.g. on a homepage or sends it to possible candidate participant communication devices 102 belonging to candidate telemeeting participants. The telemeeting server may analyze the received meeting agenda and modify the invitation message such that it becomes possible for participant communication devices to respond to the meeting agenda by selecting certain agenda items to listen in to. Thereafter, the participant communication device sends 1.3 a message comprising information of a selection of agenda items that the candidate participant wants to participate in. The telemeeting server 110 receives the message and extracts from the message the information of selection of agenda items and stores it together with an identity of the participant communication device. Thereafter, during the meeting, the telemeeting server 110 receives 1.4 a message from the organizer device 101 regarding which agenda item that is currently ongoing or about to start. The telemeeting server may then publish 1.5 a status information on e.g. a home page or send it to participant communication devices to inform of the current ongoing agenda item. Further, the telemeeting server determines 1.6 based on the received 1.4 information of ongoing agenda item and the received 1.3 selection of agenda items for the participant communication device 102 whether to trigger set-up of a telemeeting connection to the participant communication device or not. A trigger 1.7 of a connection set-up is performed if there is a match between the selected agenda item and the ongoing agenda item. The trigger of a connection set-up may be performed based on the identity of the participant communication device, the identity which was stored together with the selection of agenda items.

Figure 3:
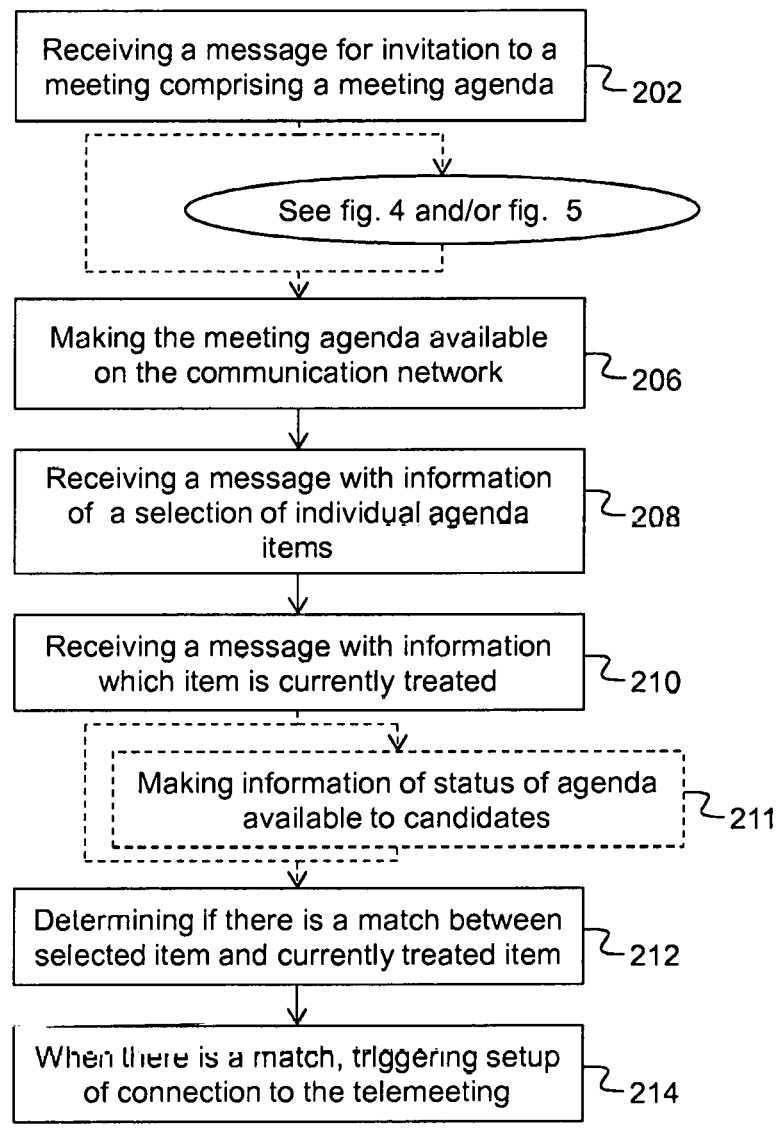
FIGS. 3-5 are flow charts describing methods performed by a communication node, e.g. an agenda server, according to possible embodiments.

According to an embodiment as shown in FIG. 3, a method is described performed by a communication node 110 in a communication network 100 (see FIG. 1) operative for facilitating participation in telemeetings. The method comprises receiving 202, from an organizer communication device 101, a message for invitation to a telemeeting comprising a meeting agenda with a number of agenda items and a time schedule for each of the number of agenda items and making 206 the meeting agenda available on the communication network for a number of candidate participant communication devices 102, 103. The method further comprises receiving 208 a message from a first 102 of the candidate participant communication devices 102, 103 comprising information of a selection of individual agenda items out of the number of agenda items, and, during the telemeeting, receiving 210 a message comprising information from the organizer communication device 101 which of the number of agenda items that is currently treated. The method further comprises determining 212, based on the messages received from the first candidate participant communication device 102 and the organizer communication device, whether there is a match between the selected individual agenda items and the item currently treated, and, when there is a match, triggering 214 setup of a connection to the telemeeting for the first candidate participant communication device 102.

The message received from the first candidate participant communication device may be received during the telemeeting. The expression "Making the agenda available" may signify publishing the meeting agenda on e.g. a web page of e.g. an Intranet or Internet, or sending the meeting agenda to the candidate participant communication devices either directly or via another node or device. The expression "A selection of individual agenda items out of the number of agenda items" may represent a selection of one or more individual agenda items that the first candidate meeting participant wants to participate in. According to an embodiment, the selected individual agenda items may be more than one and may not be adjacent each other in the agenda. When they are not adjacent in the agenda, separate notifications may be sent for the individual agenda items, especially for the agenda items that are not adjacent each other. The expression "Information from the organizer communication device which of the number of agenda items that is currently treated" may be information of an ongoing agenda item or even more advantageous, information of an agenda item that is about to be started, for example within a few minutes. The communication node performing the method may be a telemeeting server or a separate server, called e.g. an agenda server, for facilitating participation in telemeetings, which separate server is connected to the telemeeting server.

By such a method, a telemeeting connection will automatically be set-up with the meeting participant at the time when the individual agenda item that the meeting participant is interested in is about to start. The owner of the participant communication device will automatically be invited to the agenda item he/she has informed that he/she would like to take part in and does not have to wait in the telemeeting for his/her agenda item, even if the agenda time schedule has been changed during the meeting.

According to an optional embodiment shown with broken lines in FIG. 3, the method may further comprise making 211 information of status of the agenda available to the candidate participant communication devices based on the received 210 information of which of the number of agenda items that is currently treated. The expression "making 211 information of status of the agenda available" may signify to publish the information of status on e.g. an Intranet Web page that the candidate participant communication devices have access to, or to send an information message comprising the information of status to the candidate participant communication devices. The status may comprise one or more of the following: which of the agenda items that is currently treated, the meeting agenda in which already treated agenda items are marked differently than not yet treated agenda items, the meeting agenda with the currently treated agenda item highlighted, or marked differently, e.g. with a different color, than already treated or not yet treated agenda items. By such a measure it is possible for a meeting participant to follow the progress of the meeting via his/her communication device such that the meeting participant knows better when it is probable that he/she will be invited to the meeting.

Figure 4:
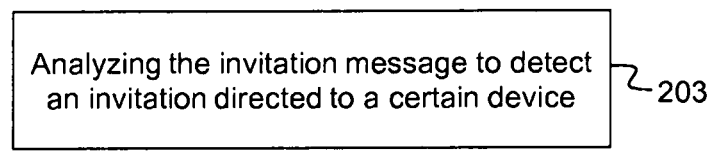

According to another embodiment shown in FIG. 4, the received invitation message may comprise an invitation directed to the first candidate participant communication device inviting the first candidate participant communication device to the individual agenda items. After receiving the invitation message, the invitation message is then analyzed 203 by the communication node to detect the invitation directed to the first candidate participant communication device. Thereafter, the step of making 206 of the agenda available according to FIG. 3 may further comprise sending the invitation directed to the first candidate participant communication device to the first candidate participant communication device. Thereby it is possible to invite a candidate participant to a certain agenda item.

According to another embodiment, the communication node 110 is a Representational State Transfer, REST, based communication node, and the messages received are in JavaScript Object Notation, JSON, format. REST is an IT architecture concept describing how services for machine-to-machine communication can be provided. JSON is a compact, text-based format used for exchanging data. JSON is specified by the Internet Engineering Task Force, IETF, as RFC 4627 and a subset of JavaScript. JSON and REST are examples of protocols/formats that may be used for requesting and transmitting information suitable for use in the methods of the described embodiments. JSON and REST, are especially suitable to use since they are easier to implement, use and understand than many other protocols. Thanks to the simplicity there are seldom requirements for specific products for communication.

Figure 5:
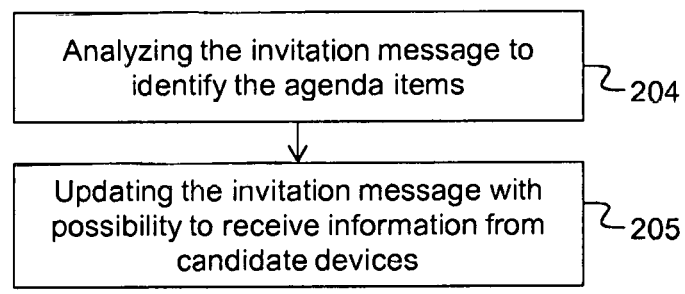

According to yet another embodiment shown in FIG. 5, the method may further comprise analyzing 204 the received invitation message to identify each of the number of agenda items and updating 205 the invitation message with a possibility to receive information from the candidate participant communication devices of a selection of individual agenda items out of the number of agenda items. Further, the step of making 206 the agenda available may comprise sending the updated invitation message to the candidate participant communication devices. Such measures make it possible for a candidate participant to automatically select individual agenda items on her device, if the invitation message received by the communication node from the organizer communication device was not in a form that made automatic selection possible. As illustrated in FIG. 3, the methods shown in FIG. 4 and FIG. 5 may be inserted in the method shown in FIG. 3 between the receiving 202 of a message for invitation to a meeting and the making 206 of the agenda available. Either of the methods shown in FIG. 4 or FIG. 5 may be inserted, or both methods.

Figure 6:
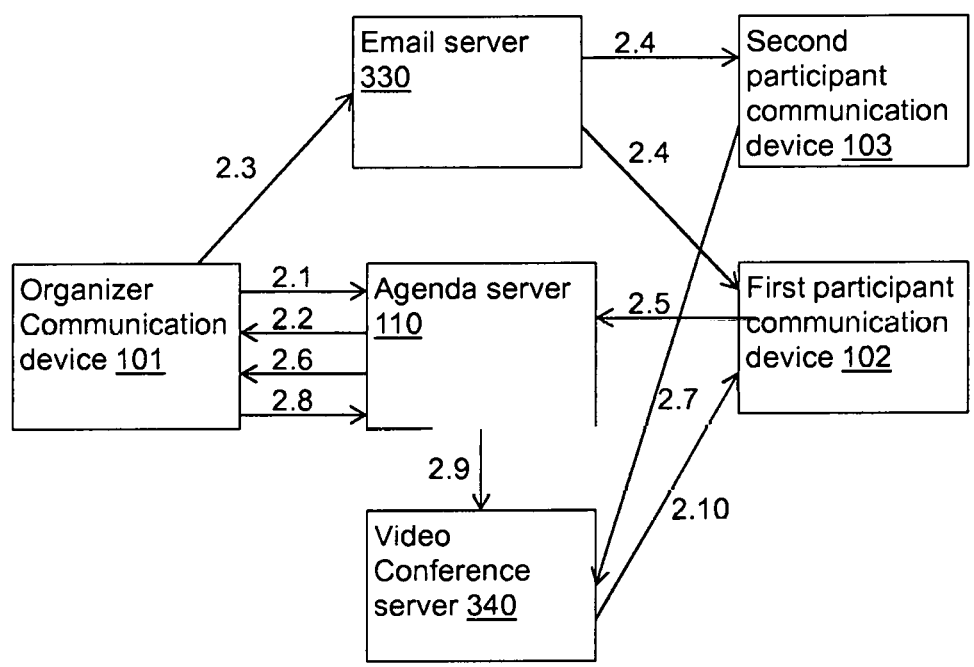
FIG. 6 is a schematic block diagram illustrating a communication system according to an embodiment, and possible signals in such a system for realizing embodiments of the present invention.

FIG. 6 shows an embodiment of a communication network with blocks illustrating communication nodes in the network and arrows between the blocks illustrating messages sent between the communication nodes according to an embodiment of a method for facilitating participation in telemeetings.

The meeting organizer writes an invitation to the telemeeting on her organizer communication device 101 and lists the agenda items to be discussed. The meeting organizer may enable the meeting to be a telemeeting using an add-on to a computer calendar tool used, for instance Microsoft® Outlook. The organizer communication device 101, e.g. the add-on of the computer calendar tool, sends 2.1 the invitation to an agenda server 110 as an invitation message. The invitation message may contain all metadata about the meeting as well as a body of the invitation. The message may be transported in JSON format. The agenda server 110 may be a REST based agenda server. The agenda server 110 then analyses content of the invitation message and identifies the different agenda items. The agenda server 110 may then update the content of the invitation message with a possibility for candidate participant communication devices 102, 103 to subscribe to the service of being invited to the meeting when a specific agenda item is to be discussed. The invitation message with its updated content is then sent 2.2 back as an invitation message response to the organizer communication device 101. The response contains a meeting ID and a conference Uniform Resource Identifier, URI, to identify the conference, and/or a Uniform Resource Locator, URL, to identify a home page address where information of the conference could be found, such as to select agenda items of interest, as well as the updated body of the meeting invitation. This response from the agenda server could be responses to long polling requests to the REST application programming Interface, API. Thereafter, the invitation message is updated with the new content, if not done in the agenda server, and is sent 2.3, 2.4 using for example e-mail to the different participants in the meeting via an email server 330. Any email protocol can be used, such as Simple Mail Transfer Protocol, SMTP. As an alternative to the messages 2.2, 2.3 and 2.4, the agenda server may itself distribute the invitation message to the candidate participant communication devices 102, 103.

The candidate participants can, when they receive the invitation on their communication devices 102, 103, accept the whole meeting or click on a link next to a specific agenda item to indicate that they are interested in participating in the meeting only for this/these specific agenda item. A message 2.5 comprising this information, i.e. device identification and which agenda items the participant has indicated, is then triggered and sent from the participant communication device, in this case the first participant communication device 102, to the agenda server 110. Data in for example JSON format may be used for identifying the indicated agenda items as well as first communication device ID. Alternatively, the user of the first communication device may be identified with a cookie from a previous request or from manual user login on the agenda server 110. The agenda server 110 records this information and sends 2.6 a message to the organizer communication device 101 informing of the first communication device ID and indicated agenda items so that the meeting organizer can see which items the first participant is going to take part in.

Participants that will join the whole meeting join 2.7 the meeting in the "normal way", e.g. by receiving an invitation to take part in the telemeeting from a video conference server 340 connected to the agenda server 110. The invitation may be sent as a normal SIP INVITE message sent. When the meeting is ongoing, the meeting organizer uses a meeting management application on her/his organizer communication device 101 and indicates in this application which agenda item that is under discussion. The organizer communication device then sends 2.8 a message to the agenda Server with information on the agenda item under discussion. The information on agenda item may be sent as JSON data using the REST API of the agenda server.

The agenda server analyses the received information of agenda items of interest received from the participant communication devices and the received information of agenda item under discussion to determine when to trigger an invitation to be sent to each participant communication device. E.g. when an agenda item which the first participant has indicated that she wants to take part is reached, the agenda server triggers 2.9 the video conference server to set up 2.10 a telemeeting call to the first participant communication device. The triggering message may be a normal SIP REFER with a "Refer-to" header set to the participants that are to be invited into the conference and a "To" header set to a focus URI of the telemeeting. The telemeeting call may be set up using a normal SIP INVITE message. The participants may have the possibility to start a meeting management application on their communication devices to monitor which item is under discussion and which participants that will be present under which points in the agenda.

According to another embodiment, the meeting agenda can be published on a web page such that the meeting agenda is shown on a screen of the individual participant communication devices. The currently treated agenda item may be marked so that it is possible to check the status of the agenda. If the participant so chooses, only the currently treated agenda item is shown, for example close to the left upper corner of the screen. The presentation on the screen could be interactive so that it is possible for the participant to click on the currently treated agenda item to show the whole agenda with all agenda points marked, possibly also those that have already been treated and those that are to be treated as they might not be treated in the order scheduled. Different colors may be used for agenda items in different status: For example, red for already treated agenda items, green for current agenda items and grey for coming agenda items. The meeting organizer may on her communication device have almost the same outline of the agenda, but also the functionality to mark the current agenda item. When he/she marks a new agenda item the recent agenda item is marked as ready (with red color) and the new agenda item is marked with green color.

Below is shown an example of what a screen of a participant communication device may look like.

| Agenda | Book/Unbook | Progress |
|---|---|---|
| Agenda item 1 | X | RED |
| Agenda item 2 |   | RED |
| Agenda item 3 |   | GREEN |
| Agenda item 4 |   | GREY |
| Agenda item 5 |   | GREY |
| Agenda item 6 | X | GREY |
| Agenda item 7 | X | GREY |

A first column (in this example the left column) may comprise identifications of agenda items, for example the title of each agenda item. A second column (the middle column in the example) may show which agenda items that the participant has booked. The third column may show the progress of each agenda item. The second column may be interactive in the way that the participant may mark in the column the agenda items she wants to participate in. It may also be possible to book/unbook an agenda item during an ongoing meeting. The progress of each agenda item as shown in the third column in the example above, may be shown by different colors where e.g. red means already treated agenda item, green means current agenda item and grey means future agenda item. Of course other color combinations or other markings may be used, such as patterns.

The screen of an organizer communication device may look like the screen of the participant communication device. A difference may be that the second column may be called "Booked" instead of "Book/unbook". The "booked"-column may show which agenda items that involve connecting a participant communication device to the telemeeting. The "progress"-column may be interactive at the organizer communication device such that the organizer can mark on the screen the agenda item to be treated and that such a marking may trigger the system to set up a connection to the participating communication devices that are marked in the "booked"-column.

According to another embodiment, the method may be performed with updated information of agenda items of interest during the telemeeting such that it is possible for a participant to book and unbook agenda items to follow during the telemeeting. The agenda server 110 then updates this information continuously. It may also be possible to monitor agendas of several telemeetings with ongoing agenda points marked. Then a participant can choose to join the conference/meeting with the most interesting topic for the time being. It may be possible to record the discussions during specific agenda points so that they can be listened to/viewed later.

Figure 7:
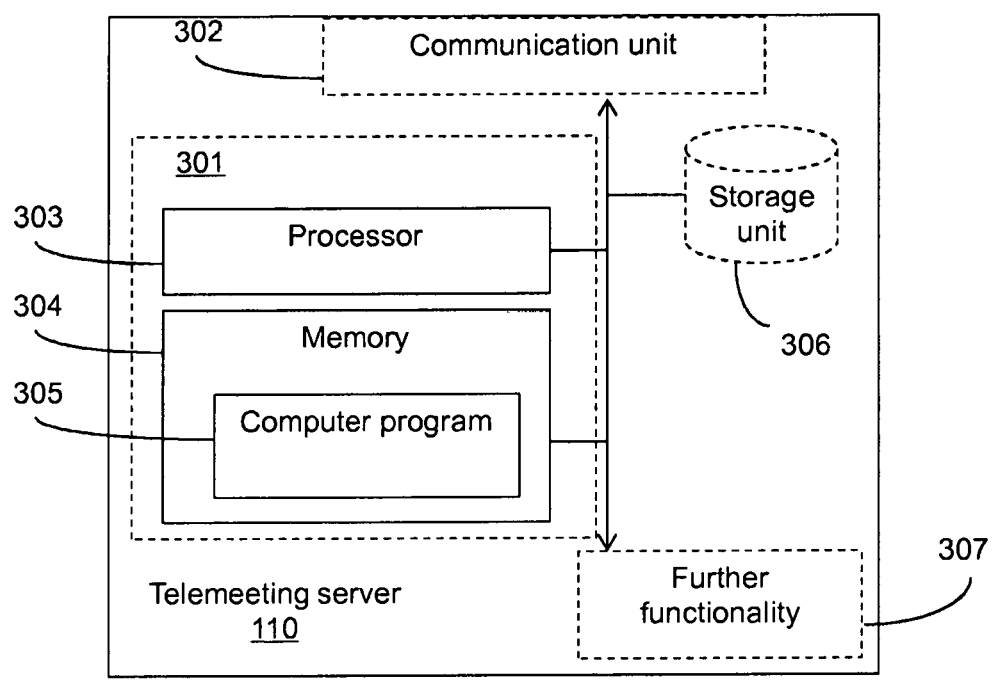
FIGS. 7-8 are block diagrams illustrating a communication node in more detail, according to possible embodiments.

FIG. 7 (see also FIG. 1) shows a communication node 110 in a communication network 100 operative for facilitating participation in telemeetings, the communication node 110 comprising a processor 303 and a memory 304, said memory containing instructions executable by said processor. Said communication node 110 is operative for receiving a message for invitation to a telemeeting comprising a meeting agenda with a number of agenda items and a time schedule for each of the number of agenda items from an organizer communication device 101 and making the meeting agenda available on the communication network for a number of candidate participant communication devices 102, 103. The communication node 110 is further operative for receiving a message from a first 102 of the candidate participant communication devices 102, 103 comprising information of a selection of individual agenda items out of the number of agenda items and, during the telemeeting, receiving a message comprising information from the organizer communication device 101 about which of the number of agenda items that is currently treated. The communication node 110 is further operative for determining, based on the messages received from the first candidate participant communication device and the organizer communication device, whether there is a match between the selected individual agenda items and the item currently treated, and, when there is a match, triggering setup of a connection to the telemeeting for the first candidate participant communication device 102. The communication node 110 may be a telemeeting server.

The communication node 110 may further comprise a communication unit 302, which may be considered to comprise conventional means for communicating from and/or to the other nodes in the network, such as nodes in the access network 120. The conventional communication means may include at least one transmitter and at least one receiver. The communication node may further comprise one or more storage units 306 and further functionality 307 useful for the communication node 110 to serve its purpose as communication node. The instructions executable by said processor may be arranged as a computer program 305 stored in said memory 304. The processor 303 and the memory 304 may be arranged in an arrangement 301. The arrangement 301 may alternatively be a micro processor and adequate software and storage therefore, a Programmable Logic Device, PLD, or other electronic component(s)/processing circuit(s) configured to perform the actions, or methods mentioned above.

The computer program 305 may comprise computer readable code means, which when run in the communication node 110 causes the communication node 110 to perform the steps described in any of the methods described in relation to FIG. 3, 4 or 5. The computer program may be carried by a computer program product connectable to the processor. The computer program product may comprise a computer readable medium on which the computer program is stored. For example, the computer program product may be a flash memory, a RAM (Random-access memory) ROM (Read-Only Memory) or an EEPROM (Electrical Erasable Programmable ROM).

Although the instructions described in the embodiments disclosed above are implemented as a computer program 305 to be executed by the processor 303 at least one of the instructions may in alternative embodiments be implemented at least partly as hardware circuits.

According to an embodiment, the communication node is further operative for making information of status of the agenda available to the candidate participant communication devices 102, 103, based on the received information of which of the number of agenda items that is currently treated.

According to another embodiment, the received invitation message comprises an invitation directed to the first candidate participant communication device 102 inviting the first candidate participant communication device to the individual agenda items. Further, the communication node 110 is operative for analyzing the invitation message to detect the invitation directed to the first candidate participant communication device. The communication node being operative for making the agenda available then comprises sending the invitation directed to the first candidate participant communication device to the first candidate participant communication device 102.

According to another embodiment, the communication node 110 is a REST based communication node, and the messages received are in JSON format.

According to another embodiment, the communication node is further operative for analyzing the received invitation message to identify each of the number of agenda items and updating the invitation message with a possibility to receive information from the candidate participant communication devices of a selection of individual agenda items out of the number of agenda items. Further, the communication node being operative for making the agenda available comprises the communication node being operative for sending the updated invitation message to the candidate participant communication devices.

Figure 8:
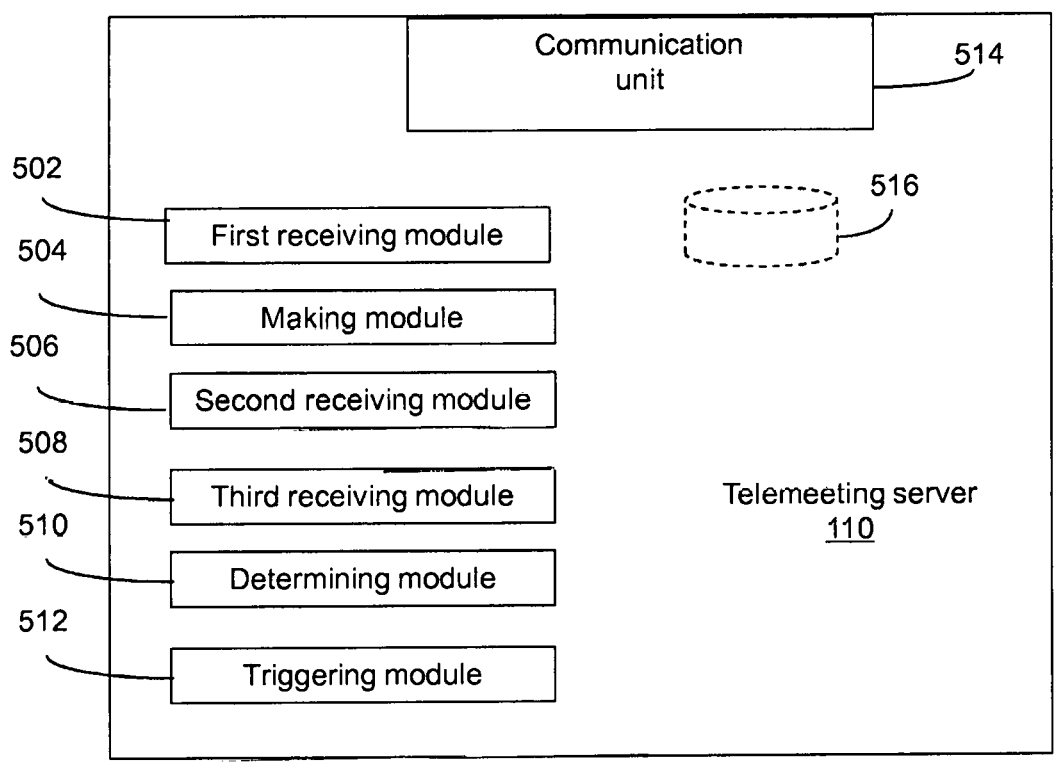

FIG. 8 shows a communication node 110 in a communication network 100, operative for facilitating participation in telemeetings. The communication node 110 comprises a first receiving module 502 for receiving a message for invitation to a telemeeting comprising a meeting agenda with a number of agenda items and a time schedule for each of the number of agenda items from an organizer communication device 101 and a making module 504 for making the meeting agenda available on the communication network for a number of candidate participant communication devices 102, 103. The communication node 110 further comprises a second receiving module 506 for receiving a message from a first 102 of the candidate participant communication devices 102, 103 comprising information of a selection of individual agenda items out of the number of agenda items and a third receiving module 508 for receiving, during the telemeeting, a message comprising information from the organizer communication device 101 which of the number of agenda items that is currently treated. The communication node 110 further comprises a determining module 510 for determining, based on the messages received from the first candidate participant communication device and the organizer communication device, whether there is a match between the selected individual agenda items and the item currently treated, and a triggering module 512 for triggering, when there is a match, setup of a connection to the telemeeting for the first candidate participant communication device 102.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby.

The invention claimed is:

1. A method performed by a communication node in a communication network operative for facilitating participation in telemeetings, the method comprising:
    receiving, from an organizer communication device, a first message for invitation to a telemeeting, wherein the first message comprises a meeting agenda with a plurality of agenda items and a time schedule for each of the plurality of agenda items;
    making the meeting agenda available on the communication network for a plurality of candidate participant communication devices;
    receiving a second message from a first one of the plurality of candidate participant communication devices, wherein the second message comprises information of a selection of one or more individual agenda items out of the plurality of agenda items;
    during the telemeeting, receiving, from the organizer communication device, a third message comprising information about which one or more of the plurality of agenda items are currently treated;
    determining, based on the second and third messages received from the first candidate participant communication device and the organizer communication device, whether there is a match between the selected one or more individual agenda items and the one or more agenda items currently treated; and
    when there is the match, triggering setup of a connection to the telemeeting for the first candidate participant communication device.

2. The method according to claim 1, further comprising: based on the information about which one or more of the plurality of agenda items are currently treated, making information of status of agenda available to the plurality of candidate participant communication devices.

3. The method according to claim 1, wherein
    the first message for invitation comprises an invitation, directed to the first candidate participant communication device, inviting the first candidate participant communication device to said one or more individual agenda items,
    the method further comprises analyzing the first message for invitation to detect the invitation directed to the first candidate participant communication device, and
    the making of the meeting agenda available comprises sending the invitation to the first candidate participant communication device.

4. The method according to claim 1, wherein the communication node is a Representational State Transfer (REST) based communication node, and the received first, second, and third messages are in JavaScript Object Notation (JSON) format.

5. The method according to claim 1, further comprising: analyzing the first message for invitation to identify each of the plurality of agenda items; and
    updating the first message for invitation with a possibility to receive, from the plurality of candidate participant communication devices, information of a selection of individual agenda items out of the plurality of agenda items,
    wherein the step of making the meeting agenda available comprises sending the updated first message for invitation to the plurality of candidate participant communication devices.

6. A communication node in a communication network for facilitating participation in telemeetings, the communication node comprising a processor and a memory, said memory containing instructions executable by said processor, whereby said communication node is operative for:
    receiving, from an organizer communication device, a first message for invitation to a telemeeting, wherein the first message comprises a meeting agenda with a plurality of agenda items and a time schedule for each of the plurality of agenda items;
    making the meeting agenda available on the communication network for a plurality of candidate participant communication devices;
    receiving a second message from a first one of the plurality of candidate participant communication devices, wherein the second message comprises information of a selection of one or more individual agenda items out of the plurality of agenda items;
    during the telemeeting, receiving, from the organizer communication device, a third message comprising information about which one or more of the plurality of agenda items are currently treated;
    determining, based on the second and third messages received from the first candidate participant communication device and the organizer communication device, whether there is a match between the selected one or more individual agenda items and the one or more agenda items currently treated; and
    when there is the match, triggering setup of a connection to the telemeeting for the first candidate participant communication device.

7. The communication node according to claim 6, further being operative for making information of status of agenda available to the plurality of candidate participant communication devices, based on the information about which one or more of the plurality of agenda items are currently treated.

8. The communication node according to claim 6, wherein
    the first message for invitation comprises an invitation, directed to the first candidate participant communication device, inviting the first candidate participant communication device to said one or more individual agenda items,
    the communication node is further operative for analyzing the first message for invitation to detect the invitation directed to the first candidate participant communication device, and
    the making of the meeting agenda available comprises sending the invitation to the first candidate participant communication device.

9. The communication node according to claim 6, wherein the communication node is a Representational State Transfer (RESTS based communication node, and the received first, second, and third messages are in JavaScript Object Notation (JSON) format.

10. The communication node according to claim 6, further being operative for:
    analyzing the first message for invitation to identify each of the plurality of agenda items; and updating the first message for invitation with a possibility to receive, from the plurality of candidate participant communication devices, information of a selection of individual agenda items out of the plurality of agenda items, and the step of making the meeting agenda available comprises sending the updated first message for invitation to the plurality of candidate participant communication devices.

11. A communication node in a communication network operative for facilitating participation in telemeetings, the communication node comprising:

a first receiving module for receiving, from an organizer communication device, a first message for invitation to a telemeeting, wherein the first message comprises a meeting agenda with a plurality of agenda items and a time schedule for each of the plurality of agenda items;

a making module for making the meeting agenda available on the communication network for a plurality of candidate participant communication devices;

a second receiving module for receiving a second message from a first one of the plurality of candidate participant communication devices, wherein the second message comprises information of a selection of one or more individual agenda items out of the plurality of agenda items;

a third receiving module for receiving, during the telemeeting, from the organizer communication device a third message comprising information about which one or more of the plurality of agenda items that are currently treated;

a determining module for determining, based on the second and third messages received from the first candidate participant communication device and the organizer communication device, whether there is a match between the selected one or more individual agenda items and the one or more agenda items currently treated; and a triggering module for triggering, when there is the match, setup of a connection to the telemeeting for the first candidate participant communication device.

12. A non-transitory computer readable storage medium storing a computer program comprising computer readable code, which when run in a communication node for facilitating participation in telemeetings, causes the communication node to perform the following steps:

receiving, from an organizer communication device, a first message for invitation to a telemeeting, wherein the first message comprises a meeting agenda with a plurality of agenda items and a time schedule for each of the plurality of agenda items;

making the meeting agenda available on the communication network for a plurality of candidate participant communication devices;

receiving a second message from a first one of the plurality of candidate participant communication devices, wherein the second message comprises information of a selection of one or more individual agenda items out of the plurality of agenda items;

during the telemeeting, receiving, from the organizer communication device, a third message comprising information about which one or more of the plurality of agenda items are currently treated;

determining, based on the second and third messages received from the first candidate participant communication device and the organizer communication device, whether there is a match between the selected one or more individual agenda items and the one or more agenda items currently treated; and when there is the match, triggering setup of a connection to the telemeeting for the first candidate participant communication device.

13. A computer program product, comprising the non-transitory computer readable medium according to claim 12.

14. The communication node according to claim 11, wherein the first receiving module, the second receiving module, and the third receiving module are the same receiving module or different receiving modules.

* * * * *